(12) United States Patent
Rhodes et al.

(10) Patent No.: US 7,438,588 B2
(45) Date of Patent: Oct. 21, 2008

(54) ENCODER AND ENCODER COVER WITH STRAIN RELIEF

(75) Inventors: Gary Rhodes, Goleta, CA (US); Esteban Cortina, Santa Barbara, CA (US)

(73) Assignee: Renco Encoders, Inc., Goleta, CA (US)

( * ) Notice: Subject to any disclaimer, the term of this patent is extended or adjusted under 35 U.S.C. 154(b) by 0 days.

(21) Appl. No.: 11/639,030

(22) Filed: Dec. 13, 2006

(65) Prior Publication Data

US 2008/0142694 A1 Jun. 19, 2008

(51) Int. Cl.
*H01R 13/58* (2006.01)

(52) U.S. Cl. .................. 439/470; 439/456; 439/457; 439/892

(58) Field of Classification Search .............. 439/470, 439/457, 892, 456, 459, 464, 471, 521
See application file for complete search history.

(56) References Cited

U.S. PATENT DOCUMENTS

| | | | | |
|---|---|---|---|---|
| 3,214,713 A | * | 10/1965 | Strobel | 439/418 |
| 3,629,525 A | * | 12/1971 | Giese, Jr. | 200/11 DA |
| 4,443,051 A | * | 4/1984 | Aguilar | 439/470 |
| 4,749,363 A | * | 6/1988 | Luska et al. | 439/367 |
| 4,978,191 A | * | 12/1990 | Hasegawa et al. | 385/26 |
| 5,573,432 A | * | 11/1996 | Hatagishi | 439/752 |
| 5,713,758 A | * | 2/1998 | Goodin et al. | 439/459 |
| 5,923,032 A | | 7/1999 | Carlson et al. | |
| 6,257,907 B1 | | 7/2001 | Feichtinger | |
| 6,392,168 B2 | * | 5/2002 | Takahashi et al. | 200/11 R |
| 6,540,547 B2 | * | 4/2003 | Zweigle | 439/468 |
| 6,617,571 B2 | | 9/2003 | Thaler et al. | |
| 7,008,257 B2 | * | 3/2006 | Zhu et al. | 439/470 |
| 2006/0030168 A1 | * | 2/2006 | Miura | 439/22 |

FOREIGN PATENT DOCUMENTS

| | | |
|---|---|---|
| DE | 202 17 089 | 6/2003 |
| EP | 0 610 869 | 8/1994 |
| EP | 0 776 065 | 5/1997 |

* cited by examiner

*Primary Examiner*—Renee S Luebke
*Assistant Examiner*—Vanessa Girardi
(74) *Attorney, Agent, or Firm*—Kenyon & Kenyon LLP

(57) ABSTRACT

An encoder includes a base member and a cover attachable to the base member. The cover includes a surface with an opening and a strain relief device associated with the opening. The strain relief device includes at least one extension member extending from the surface of the cover and at least one bar member extending from the at least one extension member. The strain relief device is integral with the cover.

24 Claims, 4 Drawing Sheets

ENCODER AND ENCODER COVER WITH STRAIN RELIEF

FIELD OF THE INVENTION

The present invention relates to an encoder and to an encoder cover with strain relief.

BACKGROUND INFORMATION

Encoders are used in industrial motion and position sensing applications, such as motor control devices, fluid flow control devices, and motion sensing and control devices. Consumer applications include such devices as computer printers, disk drives, card readers, and ticket dispensers.

Rotary encoders, also referred to as angular position encoders, are used for measuring the rotary motion of a shaft over one or a plurality of revolutions. In conjunction with gear racks or worm-gear spindles, rotary encoders can also be used to measure linear motion.

Rotary encoders receive an operating voltage from electrical connecting cables. Measuring signals are tapped off, and routed to a processing electronic device. To facilitate attachment of different types of connecting cables to a rotary encoder, a connector is provided at the encoder. A strain relief device is frequently provided for the purpose of relieving strain between the cable and the encoder, e.g., between the cable and a connector of the encoder.

Existing strain relieving devices are believed to be supplied in two general configurations-both of which include strain relief devices that are separate components from the encoder. In the first configuration, the encoder is supplied with the connecting cable already attached to the encoder and strain relieved. In the second configuration, there is no cable attached to the encoder and the strain relief is attached after the connecting cable has been attached to the encoder.

There is believed to be a need for an encoder that includes a strain relief device that is integral with a cover of the encoder. Such a device permits the cover/strain relief device to be installed by a customer and additional steps are not necessarily required to strain relieve the connecting cable.

SUMMARY

According to an example embodiment of the present invention, an encoder includes: a base member; and a cover attachable to the base member, the cover including a surface with an opening and a strain relief device associated with the opening and integral with the cover, the strain relief device including at least one extension member extending outwardly from the surface and at least one bar member extending from the at least one extension member.

The bar member may be substantially perpendicular to the extension member.

The strain relief device may include two extension members, each extending outwardly from the surface at a respective side of the opening, and a single bar member extending between the extension members.

The two extension members may be substantially parallel to each other, and the bar member may be substantially perpendicular to the two extension members.

The bar member may be longer than the extension member.

The extension member may include at least one groove adapted to receive a cable tie.

The strain relief device may define a portion of the opening.

The surface may include a sectional cut-out, and the opening may be inside the cut-out.

The extension member may extend from an edge of the cut-out and define a portion of the opening.

The cut-out may have a rectangular box shape with a bottom surface defining a portion of the opening.

The cover may be formed of a polymeric material.

The cover may be injection molded.

The cover may include at least two snaps that are configured to attach the cover to the base member.

The encoder may include a base plate, and the base member may be attachable to the base plate.

The base member may include a connector attachable to a mating component of a cable, and the cable may be passable through the strain relief device between the bar member and at least one of (a) the cover and (b) the base member.

The cover may include a sectional cut-out, the opening may be arranged inside the cut-out, the connector may be extendable into the cut-out, and the strain relief device may be proximate the cut-out.

The strain relief device may be adapted to accommodate at least one of (a) a ribbon cable, (b) a round cable and (c) individual conductors of a multi-conductor cable.

The cover may have a circular profile, the bar member may be arranged substantially tangential to the surface, and the extension member may outwardly substantially radially from the surface.

According to an example embodiment of the present invention, a cover for an encoder includes: a surface with an opening; and an integral strain relief device associated with the opening, the strain relief device including at least one extension member extending outwardly from the surface and at least one bar member extending from the at least one extension member.

According to an example embodiment of the present invention, an encoder system includes: an encoder including: a base member including a connector; and a cover attachable to the base member, the cover including a surface with an opening and a strain relief device associated with the opening and integral with the cover, the strain relief device including at least one extension member extending outwardly from the surface and at least one bar member extending from the at least one extension member, the connector of the base member exposed through the opening; and a cable electrically connected to the connector of the encoder and disposed between the strain relief device and at least one of (a) the base member and (b) the cover.

Example embodiments of the present invention are described in more detail below with reference to the appended Figures.

DETAILED DESCRIPTION

Figure 1:
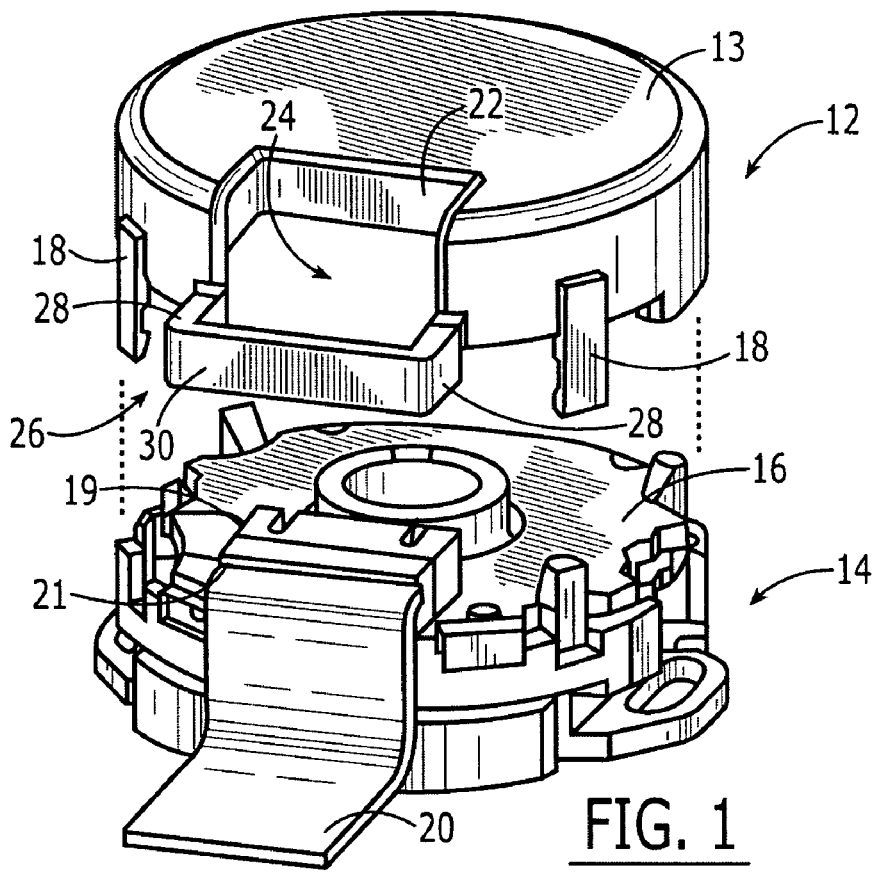
FIG. 1 is an exploded perspective view of an encoder with a detached cover.

Like reference characters denote like parts in the several drawings.

FIG. 1 is an exploded perspective view of an encoder 10, e.g., a rotary encoder or modular rotary encoder, with a cover 12 detached from a base member 14. A circuit board 16 is attached to the base member 14 and includes a connector 19. A cable 20, e.g., a ribbon cable, has a mating component 21 that attaches to connector 19. Base member 14 may include the following components: a shaft (for attachment to a first component whose, e.g., angular, position relative to a second component is to be measured by the encoder); an encoder disk; and a flange (see, e.g., FIG. 8) to provide for attachment of the base member 14 to the second component. The first component may be, e.g., a motor shaft, and the second component may be, e.g., a stationary motor housing. The shaft may be supported by a base member, such as base member 14, and the encoder disk may be secured to the shaft. Alternatively, the shaft may drive one or more encoder disks via a gear unit. The encoder 10 may provide for relative and/or absolute measurement, which, e.g., may be performed photoelectrically, magnetically, capacitively or conductively. If the encoder 10 operates on a photoelectric principle, the encoder 10 includes a light source that radiates a light beam that is modulated by the encoder disk as a function of position. The modulated light arrives at detector(s), which may be arranged on a circuit board, such as circuit board 16. The operation and structure of encoder 10 may be as described, for example, in U.S. Pat. Nos. 5,923,032, 6,257,907, 6,617,571 or European Published Patent Application No. 0 610 869, each of which is expressly incorporated herein in its entirety by reference thereto.

Cover 12 is attachable to base member 14 (see, e.g., FIG. 2) and includes two snaps 18 configured to secure cover 12 to base member 14. Additional snaps and/or other mechanisms for securing a cap to a body may be provided. In addition to protecting circuit board 16, cover 12 protects and provides for strain relief of cable 20. Cover 12 has a surface 13 that includes a sectional cut-out 22 with an opening 24. Strain relief device 26 is associated with opening 24. Cut-out 22 has a generally rectangular box shape but may be provided in a variety of shapes suitable for protecting connector 19 and facilitating the use of strain relief device 26. Strain relief device 26 includes two extension members 28 and a bar member 30 extending between the extension members 28. The two extension members 28 are substantially parallel to each other and the bar member 30 is substantially perpendicular to and longer than the two extension members 28. For a round cover 12, the bar member 30 is arranged substantially tangential to the outer circumference of the side wall of the cover 12, and the extension member 28 extend generally radially from the side wall of the cover. Extension members 28 extend from the edges of cut-out 22 but may also be provided in other areas of surface 13. Strain relief device 26 may have alternate configurations such as a single extension member with a bar member extending therefrom, i.e., forming a general L shape. Strain relief device 26 may be configured to accommodate flat cables, round cables and/or individual wires or conductors of a multi-conductor cable. Strain relief device 26 is integral with cover 12. As such, strain relief device 26 and cover 12 are arranged as a single structural member. Cover 12, including strain relief 26 device, may be fabricated from a polymeric material. Furthermore, cover 12, including strain relief device 26, may be injection molded. Other materials suitable for encoder applications may also be used to fabricate cover 12 and strain relief device 26. Strain relief device 26 may also be fabricated separately from cover 12 and later attached to cover 12.

Opening 24 is located inside cut-out 22. The bottom inside edge of cut-out 22 and the inside edge of strain relief device 26 form the perimeter of opening 24. Opening 24 is configured such that when cover 12 is attached to base member 14 connector 19 is exposed through opening 24 and is positioned within cut-out 22. Cover 12, may, however, not include a cut-out, and connector 12 may be located inside cover 12. Strain relief device 26 extends over cable 20, which is connected to connector 19. Strain relief device 26 may thereby substantially prevent the transmission of a pulling force applied to cable 20 outside rotary encoder 10 to connector 19. Additionally, snaps 18 may prevent a force on strain relief device 26 from causing cover 12 to open or disengage from base member 14. Because strain relief device 26 is a part of, or attached to, cover 12, the removal of cover 12 may provide easy access to cable 20 and the components of base member 14. Accordingly, the attachment, detachment and strain relief of cable 20 may be facilitated.

Figure 2:
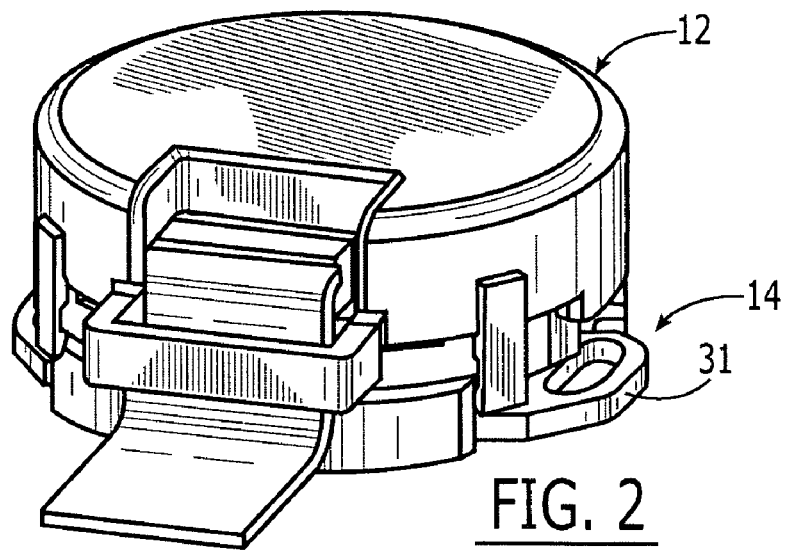
FIG. 2 is a perspective view of the encoder illustrated in FIG. 1.

FIG. 2 is a perspective view of rotary encoder 10 with cover 12 attached to base member 14. Snaps 18 attach cover 12 to base member 14. As set forth above, additional snaps and/or other mechanisms for securing a cap to a body may be provided. Base member 14 includes connection piece 31, which may be configured to permit connection of base member 14 directly to a body, e.g., a stationary motor housing, or to a base plate (see FIG. 8).

It should be appreciated that the strain relief device 26 is arranged such that assembly of the cover 12 onto the base member 14 after cable 20 is connected to the connector of the encoder 10 captures the cable 20 between the strain relief device 26 and the cover 12 and/or base member 14. Thus, cable 20 is strain relieved without requiring additional assembly or manufacturing steps or expense. Cable 20 may be attached to the encoder 10 by a customer of the encoder 10, or cable 20 may be assembled with the encoder 10 by the manufacturer of the encoder 10.

Figure 3:
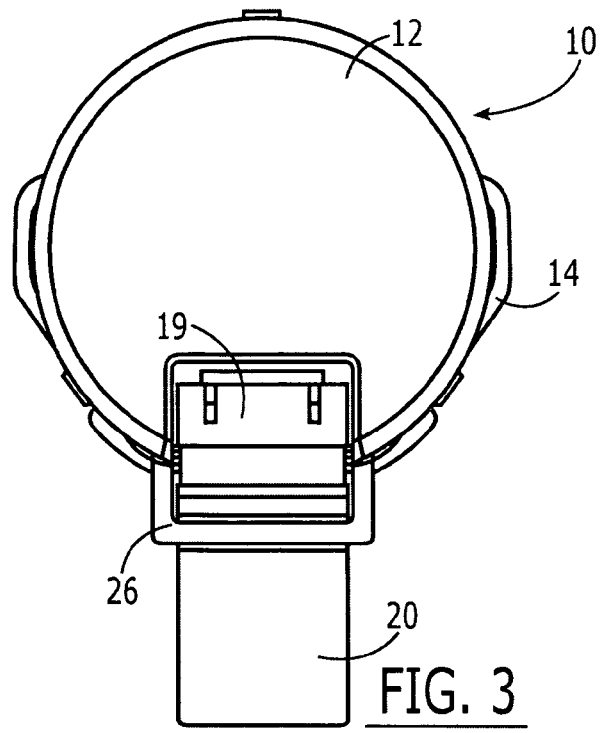
FIG. 3 is a top view of the encoder illustrated in FIGS. 1 and 2.

FIG. 3 is a top view of the encoder 10. Cable 20 is routed through strain relief device 26, between the strain relief device 26 and the base member 14 and the side wall of the cover 12, and connects to connector 19.

Figure 4:
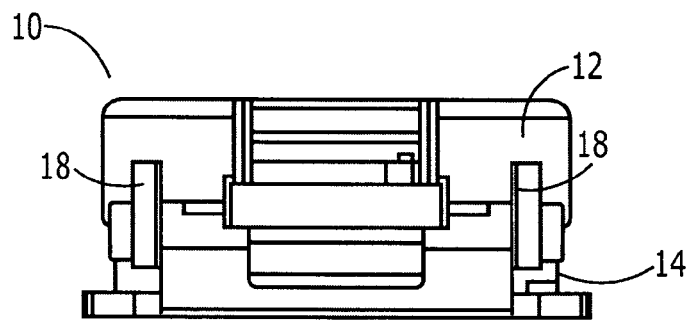
FIG. 4 is a front view of the encoder illustrated in FIGS. 1 to 3.

FIG. 4 is a front view of the encoder 10. Snaps 18 securely attach cover 12 to base member 14.

Figure 5:
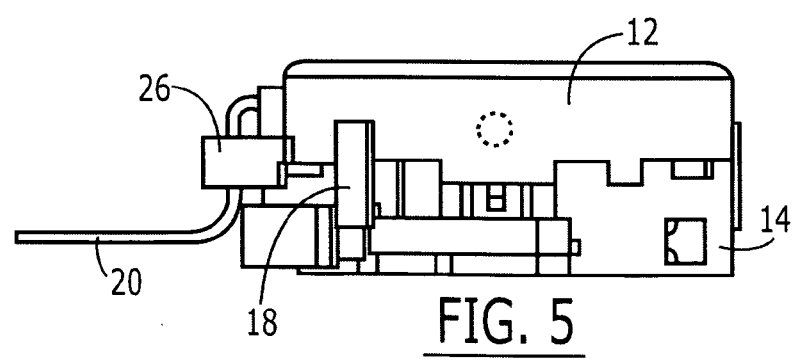
FIG. 5 is a side view of the encoder illustrated in FIGS. 1 to 4.

FIG. 5 is a side view of the encoder 10. Cable 20 is strain relieved by strain relief device 26. As illustrated in FIG. 5, the strain relief device may include a portion that extends beyond the lower edge of the cover 12 so that cable 20 is held between the strain relief device 26 and the base member 14 and side wall of cover 12.

Figure 6:
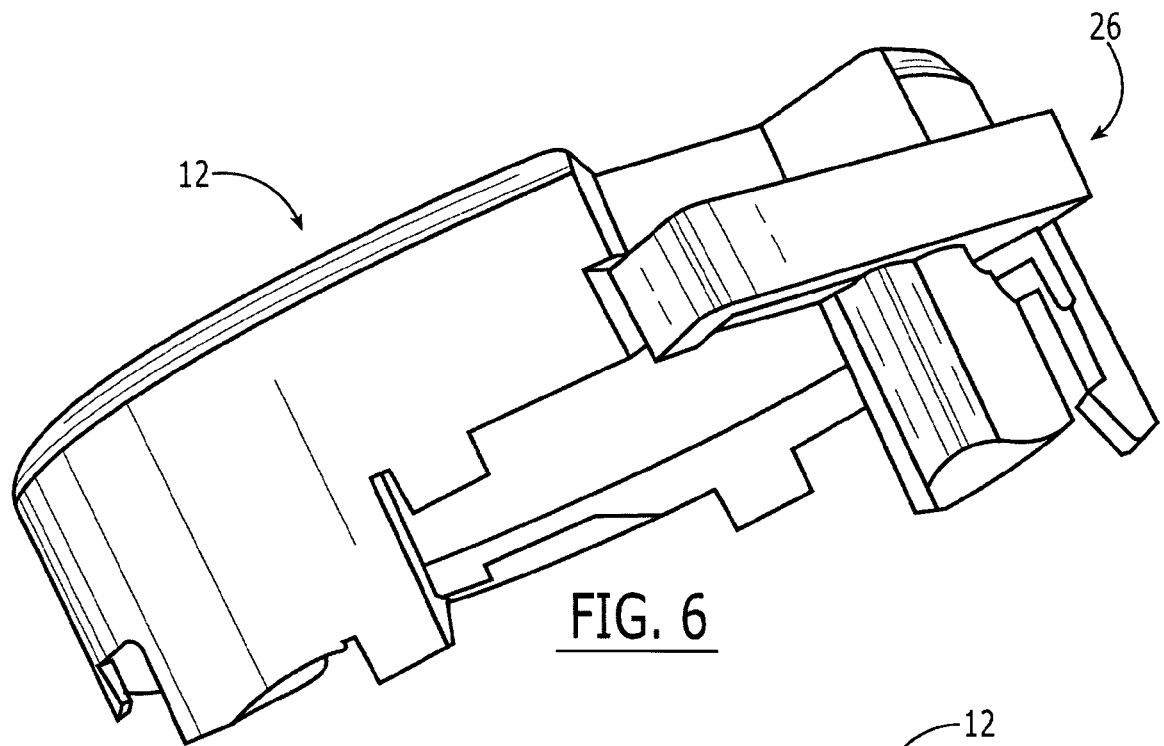
FIG. 6 is a perspective view of a cover with an integral strain relief device.

FIG. 6 is a perspective view of an example embodiment of cover 12 with strain relief device 26. Strain relief device 26 and cover 12 are a single structural component.

Figure 7:
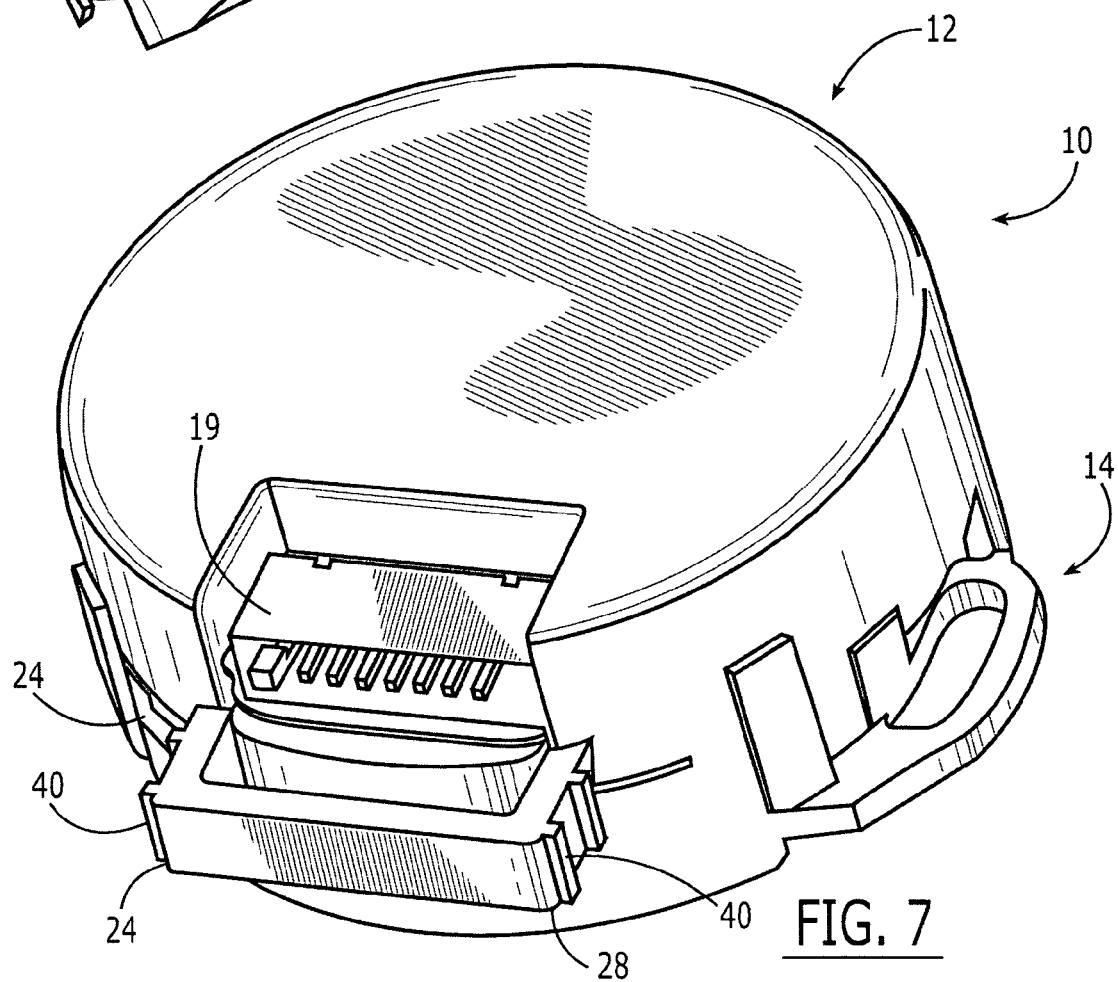
FIG. 7 is a perspective view of a rotary encoder.

FIG. 7 is a perspective view of an example embodiment of encoder 10 with cover 12 attached to base member 14. Extension members 28 are shown with grooves 40 adapted to receive a cable tie. Attachment of a cable tie may further facilitate the strain relief of a cable. As illustrated in FIG. 7, connector 19 is exposed through opening 24.

Figure 8:
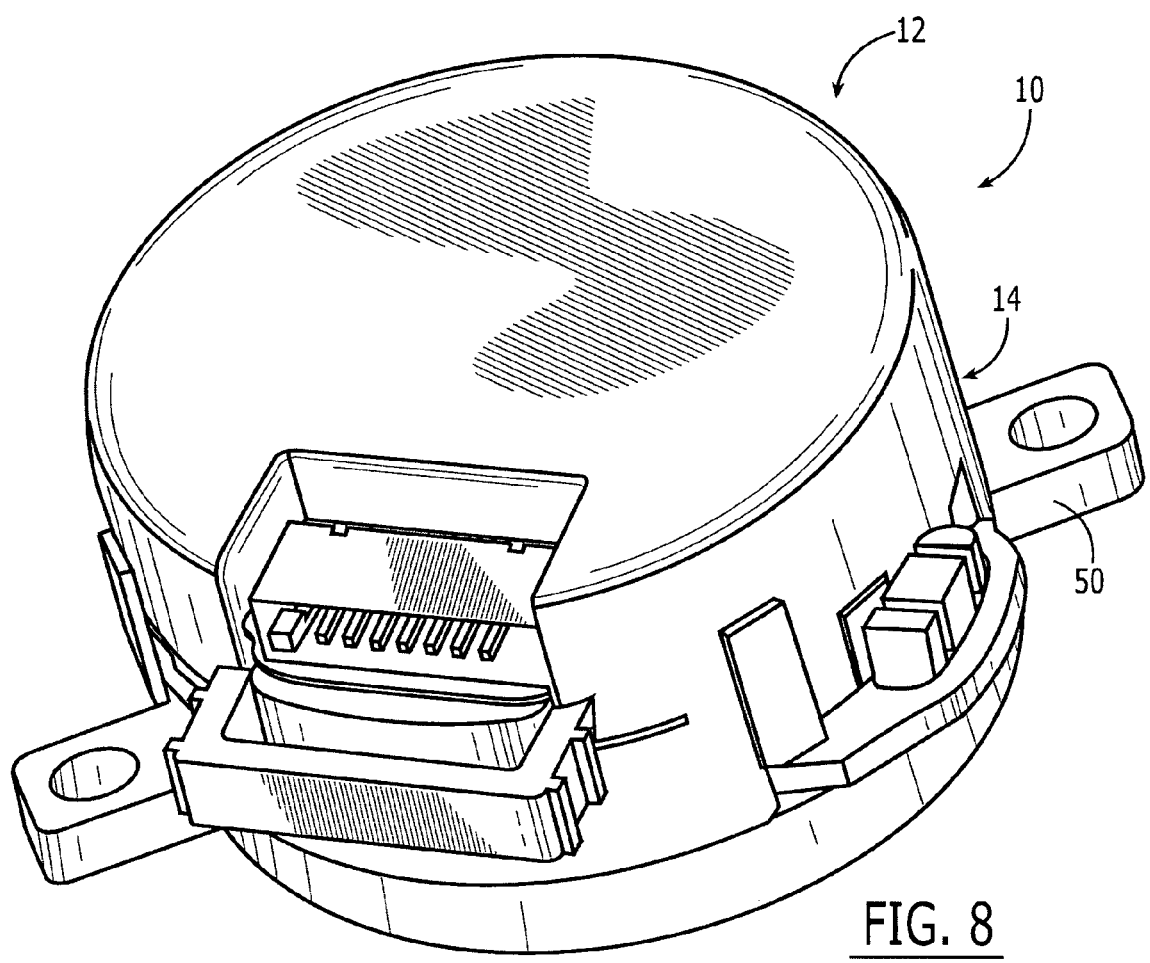
FIG. 8 is a perspective view of an encoder attached to a base plate.

FIG. 8 is a perspective view of an example embodiment of encoder 10 attached to a base plate 50. Base plate 50 is attachable to base member 14 and may facilitate the attachment of encoder 10 to, e.g., a motor housing. That is, connector 16 is disposed on one side, e.g., the top side, of the strain relief device 26, and the entry location of the cable 20 to the strain relief device 26 is on the opposite side of the strain relief device 26, e.g., the bottom side.

While cable 20 is illustrated as a ribbon cable, it should be appreciated that cable 20 may be arranged in other shapes, e.g., round, and may be a multi-conductor cable. An outer sheath or jacket of a multi-conductor cable may be removed a distance from the connector so that the individual conductors are disposed in strain relief device and strain relieved by the strain relief device.

While encoder 10 is illustrated as a rotary encoder and base member 14 and cover 12 are illustrated as having a generally circular profile, it should be understood that encoder 10 is not limited to a rotary encoder and that the profiles of base member 14 and cover 12 are not limited to circular profiles. For example, encoder 10 may be a linear encoder, and base member and cover 12 may have rectangular profiles.

What is claimed is:

1. An encoder, comprising:
    a base member; and
    a cover attachable to the base member, the cover including a side wall and a top wall, a cut-out forming an opening in both the side wall and the top wall into an interior of the cover and a strain relief device associated with the opening and integral with the cover, the strain relief device including at least one extension member projecting outwardly from the side wall and at least one bar member extending from the at least one extension member and spanning the opening.

2. The encoder according to claim 1, wherein the bar member is substantially perpendicular to the extension member.

3. The encoder according to claim 1, wherein the bar member is longer than the extension member.

4. The encoder according to claim 1, wherein the extension member includes at least one groove adapted to receive a cable tie.

5. The encoder according to claim 1, wherein the strain relief device defines a portion of the opening.

6. The encoder according to claim 1, wherein the cover is formed of a polymeric material.

7. The encoder according to claim 1, wherein the cover is injection molded.

8. The encoder according to claim 1, wherein the cover includes at least two snaps that are configured to attach the cover to the base member.

9. The encoder according to claim 1, further comprising a base plate, the base member attachable to the base plate.

10. The encoder according to claim 1, wherein the strain relief device is adapted to accommodate at least one of (a) a ribbon cable, (b) a round cable and (c) individual conductors of a multi-conductor cable.

11. The encoder according to claim 1, wherein the cover has a circular profile, the bar member arranged substantially tangential to the surface, the extension member extending outwardly substantially radially from the surface.

12. The encoder according to claim 1, wherein the strain relief device includes two extension members, each extending outwardly from the surface at a respective side of the opening, and a single bar member extending between the extension members.

13. The encoder according to claim 12, wherein the two extension members are substantially parallel to each other and the bar member is substantially perpendicular to the two extension members.

14. The encoder according to claim 1, wherein the surface includes a sectional cut-out, the opening inside the cut-out.

15. The encoder according to claim 14, wherein the extension member extends from an edge of the cut-out and defines a portion of the opening.

16. The encoder according to claim 15, wherein the cut-out has a rectangular box shape with a bottom surface defining a portion of the opening.

17. The encoder according to claim 1, wherein the base member includes a connector attachable to a mating component of a cable, the cable passable through the strain relief device between the bar member and at least one of (a) the cover and (b) the base member.

18. The encoder according to claim 17, wherein the cover includes a sectional cut-out, the opening inside the cut-out, the connector extendable into the cut-out, the strain relief device proximate the cut-out.

19. An encoder, comprising:
    a base member; and
    a cover attachable to the base member, the cover including a peripheral surface with an opening to an interior of the cover and a strain relief device associated with the opening and integral with the cover, the strain relief device including at least one extension member extending outwardly from the surface and at least one bar member extending from the at least one extension member and spanning the opening;
    wherein the encoder is configured to detect rotational movement between a first component and a second component, the base member including a shaft configured to attach to the first component, an encoder disk coupled to the shaft, the base member configured to couple to the second component, the cover configured to cover the encoder disk and the shaft.

20. An encoder, comprising:
    a base member; and
    a cover attachable to the base member, the cover including a peripheral surface with an opening opening to an interior of the cover and a strain relief device associated with the opening and integral with the cover, the strain relief device including at least one extension member extending outwardly from the surface and at least one bar member extending from the at least one extension member and spanning the opening;
    wherein the encoder is arranged as a rotary encoder configured for at least one of (a) absolute and (b) relative measurement.

21. A cover for an encoder, comprising:
    a side wall and a top wall, a cut-out forming an opening in both the side wall and the top wall into an interior of the cover; and
    an integral strain relief device associated with the opening, the strain relief device including at least one extension member projecting outwardly from the side wall and at least one bar member extending from the at least one extension member and spanning the opening.

22. An encoder system, comprising:
    an encoder including:
        a base member including a connector; and
        a cover attachable to the base member, the cover including a side wall and a top wall, a cut-out forming an opening in both the side wall and the top wall into an interior of the cover and a strain relief device associated with the opening and integral with the cover, the strain relief device including at least one extension member projecting outwardly from the side wall and at least one bar member extending from the at least one extension member and spanning the opening, the connector of the base member exposed through the opening; and a cable electrically connected to the connector of the encoder and disposed between the strain relief device and at least one of (a) the base member and (b) the cover.

23. An encoder system, comprising:
an encoder including:
   a base member including a connector; and
   a cover attachable to the base member, the cover including a peripheral surface with an opening to an interior of the cover and a strain relief device associated with the opening and integral with the cover, the strain relief device including at least one extension member extending outwardly from the surface and at least one bar member extending from the at least one extension member and spanning the opening, the connector of the base member exposed through the opening; and
a cable electrically connected to the connector of the encoder and disposed between the strain relief device and at least one of (a) the base member and (b) the cover;
wherein the encoder is configured to detect rotational movement between a first component and a second component, the base member including a shaft configured to attach to the first component, an encoder disk coupled to the shaft, the base member configured to couple to the second component, the cover configured to cover the encoder disk and the shaft.

24. An encoder system, comprising:
an encoder including:
   a base member including a connector; and
   a cover attachable to the base member, the cover including a peripheral surface with an opening to an interior of the cover and a strain relief device associated with the opening and integral with the cover, the strain relief device including at least one extension member extending outwardly from the surface and at least one bar member extending from the at least one extension member and spanning the opening, the connector of the base member exposed through the opening; and
a cable electrically connected to the connector of the encoder and disposed between the strain relief device and at least one of (a) the base member and (b) the cover;
wherein the encoder is arranged as a rotary encoder configured for at least one of (a) absolute and (b) relative measurement.

* * * * *